(12) United States Patent
Jeong et al.

(10) Patent No.: US 11,024,834 B2
(45) Date of Patent: Jun. 1, 2021

(54) ELECTRODE COATING APPARATUS

(71) Applicant: LG CHEM, LTD., Seoul (KR)

(72) Inventors: Hee Seok Jeong, Daejeon (KR); Myung Ki Lee, Daejeon (KR); Jooyong Song, Daejeon (KR); Ji Hee Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 228 days.

(21) Appl. No.: 15/771,907

(22) PCT Filed: Sep. 4, 2017

(86) PCT No.: PCT/KR2017/009648
§ 371 (c)(1),
(2) Date: Apr. 27, 2018

(87) PCT Pub. No.: WO2018/048153
PCT Pub. Date: Mar. 15, 2018

(65) Prior Publication Data
US 2018/0337393 A1     Nov. 22, 2018

(30) Foreign Application Priority Data

Sep. 9, 2016 (KR) .......................... 10-2016-0116356

(51) Int. Cl.
*B05C 5/00* (2006.01)
*H01M 4/04* (2006.01)
(Continued)

(52) U.S. Cl.
CPC ........... *H01M 4/0471* (2013.01); *B05C 5/001* (2013.01); *B05C 11/1042* (2013.01); *H01M 4/04* (2013.01);
(Continued)

(58) Field of Classification Search
None
See application file for complete search history.

(56) References Cited

U.S. PATENT DOCUMENTS 3,521,325 A * 7/1970 Schippers ............... B29B 9/065
425/3
3,920,365 A * 11/1975 Mules ....................... G05D 5/03
425/141
(Continued)

FOREIGN PATENT DOCUMENTS

JP     2005-270879 A     10/2005
KR  10-2008-0039286 A     5/2008
(Continued)

OTHER PUBLICATIONS

International Search Report for PCT/KR2017/009648 dated Dec. 12, 2017.
(Continued)

*Primary Examiner* — Charles Capozzi
(74) *Attorney, Agent, or Firm* — Birch, Stewart, Kolasch & Birch LLP

(57) ABSTRACT

The present invention relates to an electrode coating apparatus that is capable of adjusting a temperature of electrode slurry. Also, the electrode coating apparatus for applying electrode slurry to an electrode collector includes a storage part storing the electrode slurry, a discharge part discharging the electrode slurry stored in the storage part to the electrode collector, and a heating part heating the discharge part.

9 Claims, 5 Drawing Sheets

(51) Int. Cl.
  *H01M 10/04* (2006.01)
  *B05C 11/10* (2006.01)
  *H01M 4/88* (2006.01)

(52) U.S. Cl.
  CPC ....... *H01M 4/0404* (2013.01); *H01M 4/0411* (2013.01); *H01M 4/8828* (2013.01); *H01M 4/8896* (2013.01); *H01M 10/04* (2013.01)

(56) References Cited

U.S. PATENT DOCUMENTS

| | | | | |
|---|---|---|---|---|
| 4,065,034 | A | * | 12/1977 | Callan .................... B05C 3/132 222/146.5 |
| 4,531,138 | A | * | 7/1985 | Endo ......................... B41J 2/14 347/171 |
| 5,021,808 | A | * | 6/1991 | Kohyama ............ B41J 2/14104 346/46 |
| 5,348,604 | A | * | 9/1994 | Neff ........................ B05B 7/228 156/272.8 |
| 5,609,687 | A | * | 3/1997 | Neff ........................ B05B 7/228 118/620 |
| 5,891,526 | A | * | 4/1999 | Brady ...................... B05D 1/34 118/302 |
| 6,280,799 | B1 | * | 8/2001 | Okabe .................... B05C 5/001 427/261 |
| 2008/0102196 | A1 | | 5/2008 | Morishima et al. |
| 2011/0244144 | A1 | * | 10/2011 | Uchida ................. H01M 4/139 427/596 |
| 2013/0189577 | A1 | | 7/2013 | Wang et al. |
| 2014/0377451 | A1 | | 12/2014 | Kim et al. |
| 2015/0243964 | A1 | | 8/2015 | Yu et al. |
| 2016/0114340 | A1 | | 4/2016 | Choi et al. |
| 2018/0250699 | A1 | * | 9/2018 | Ikagawa ................. F04B 9/103 |

FOREIGN PATENT DOCUMENTS

| | | |
|---|---|---|
| KR | 10-2014-0116127 A | 10/2014 |
| KR | 10-2014-0132618 A | 11/2014 |
| KR | 10-2014-0147246 A | 12/2014 |
| KR | 10-2015-0105794 A | 9/2015 |

OTHER PUBLICATIONS

Extended European Search Report, dated Dec. 7, 2018, for European Application No. 17849037.1.

* cited by examiner

ELECTRODE COATING APPARATUS

CROSS-REFERENCE TO RELATED APPLICATION

The present application claims the benefit of the priority of Korean Patent Application No. 10-2016-0116356, filed on Sep. 9, 2016, which is hereby incorporated by reference in its entirety.

TECHNICAL FIELD

The present invention relates to an electrode coating apparatus, and more particularly, to an electrode coating apparatus that is capable of adjusting a temperature of electrode slurry.

BACKGROUND ART

Secondary batteries are rechargeable unlike primarily batteries, and also, the possibility of compact size and high capacity is high. Thus, recently, many studies on secondary batteries are being carried out.

Such a secondary battery is manufactured in a shape in which one battery cell is packaged in a pack form or a pack shape in which several tens of battery cells are connected to each other. As a result, secondary batteries are being widely used for power sources for driving motors of vehicles.

Electrode slurry in which an active material and a conductive material are mixed is applied to an electrode sheet and then dried at a high temperature to perform a pressing process, thereby manufacturing an electrode of a secondary battery.

A slot die coater for producing an electrode, which is used as an electrode coating apparatus, is an apparatus for applying electrode slurry onto an electrode sheet.

That is, the slot die coater denotes an apparatus in which a liquid fluid (slurry, an adhesive, a hard coating agent, ceramic, etc.) having fluidity is supplied between upper and lower slot dies by using a pulse-free pump or piston pump to apply a fluid supplied from a liquid supply pipe to a uniform thickness in a width direction with respect to an advancing direction of an object to be coated such as fabrics, films, glass plates, and sheets.

FIG. 1 is a schematic view of a slot die coater that is an electrode coating apparatus according to a related art.

Referring to FIG. 1, a slot die coater 100 for producing an electrode may be an apparatus in which a die coater is applied to produce an electrode, i.e., an apparatus for applying electrode slurry 111 that is a supply fluid onto an electrode sheet 110 to produce the electrode for a secondary battery.

The conventional technology in which such a slot die coater is used to applying electrode slurry onto an electrode sheet is disclosed in Korea Patent Publication No. 10-2008-0039286.

In the electrode coating apparatus (the slot die coater) according to the related art, a solid content does not increase due to the fluidity problem of the electrode slurry. Thus, the electrode slurry is applied to the electrode by using the slot die coater, and then, the electrode coated with the electrode slurry is dried through a drying process.

However, in such a conventional method, since a drying zone increases in length, and drying time increases, while the electrode slurry passes through the drying zone and dried, a binder of the electrode slurry may flow to deteriorate adhesion between a collector and an electrode.

DISCLOSURE OF THE INVENTION

Technical Problem

Therefore, the present invention has been made to solve the abovementioned limitations, and an object of the prevent invention is to provide an electrode coating apparatus that is capable of adjusting a temperature of electrode slurry discharged to an electrode.

Technical Solution

An electrode coating apparatus for applying electrode slurry to an electrode collector according to an embodiment of the present invention includes a storage part storing the electrode slurry, a discharge part discharging the electrode slurry stored in the storage part to the electrode collector, and a heating part heating the discharge part.

The heating part may heat the discharge part by using a laser.

The heating part may heat the discharge part at a temperature of 100° C. to 130° C.

The heating part may locally heat the discharge part.

When the heating part heats the discharge part, the storage part may be heated at a temperature less than that of the discharge part by heat conducted from the discharge part.

The heating part may start the drying of the electrode slurry from the time when the electrode slurry passes through the discharge part.

The heating part may reduce a viscosity of the electrode slurry stored in the storage part.

The heating part may adjust a heating temperature of the discharge part.

Advantageous Effects

According to the present invention, the drying of the electrode slurry may start from the initial discharge of the electrode slurry to reduce the overall drying time of the electrode slurry applied to the electrode collector.

According to the present invention, the drying zone in which the electrode slurry applied to the electrode collector is dried may be minimized in length.

According to the present invention, the electrode slurry may decrease in viscosity due to the increase in temperature of the electrode slurry storage part and the discharge part and thus mixed to increase in solid content when the electrode slurry is manufactured.

According to the present invention, the drying time of the electrode slurry applied to the electrode collector may be reduced to minimize the flow of the binder within the electrode slurry.

According to the present invention, the flow of the binder within the electrode slurry may be minimized to improve the adhesion of the interface between the electrode and the collector.

MODE FOR CARRYING OUT THE INVENTION

Figure 1:
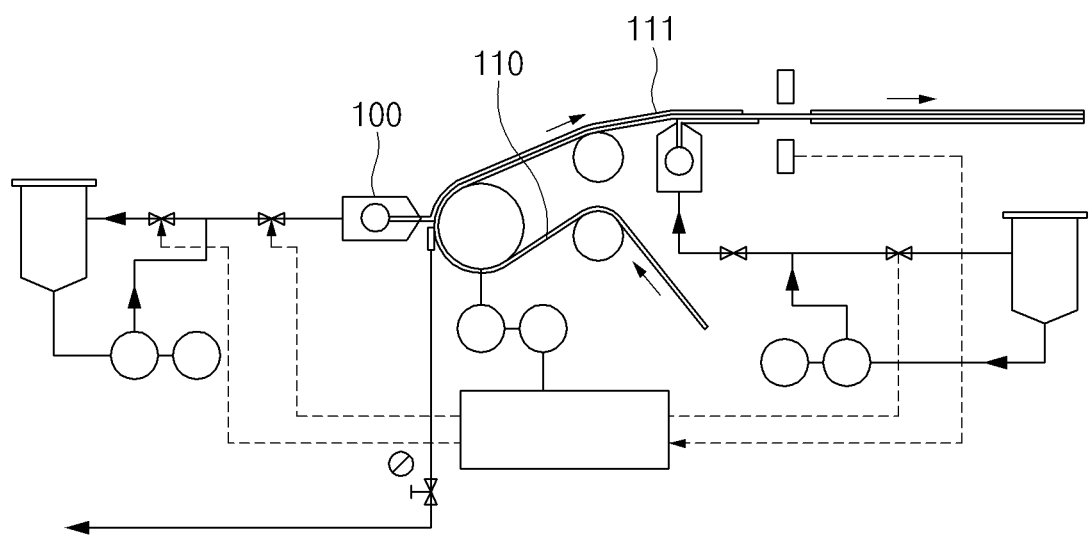
FIG. 1 is a schematic view of an electrode coating apparatus according to a related art.

Hereinafter, an electrode coating apparatus according to a preferred embodiment of the present invention will be described in detail with reference to the accompanying drawings.

Terms or words used in the specification and claims should not be construed as limited to a lexical meaning, and should be understood as appropriate notions by the inventor based on that he/she is able to define terms to describe his/her invention in the best way to be seen by others. Therefore, embodiments and drawings described herein are simply exemplary and not exhaustive, and it will be understood that various equivalents may be made to take the place of the embodiments.

In the drawings, the dimension of each of components or a specific portion constituting the component is exaggerated, omitted, or schematically illustrated for convenience in description and clarity. Thus, the dimension of each element does not entirely reflect an actual size. Moreover, detailed descriptions related to well-known functions or configurations will be ruled out in order not to unnecessarily obscure subject matters of the present invention.

Figure 2:
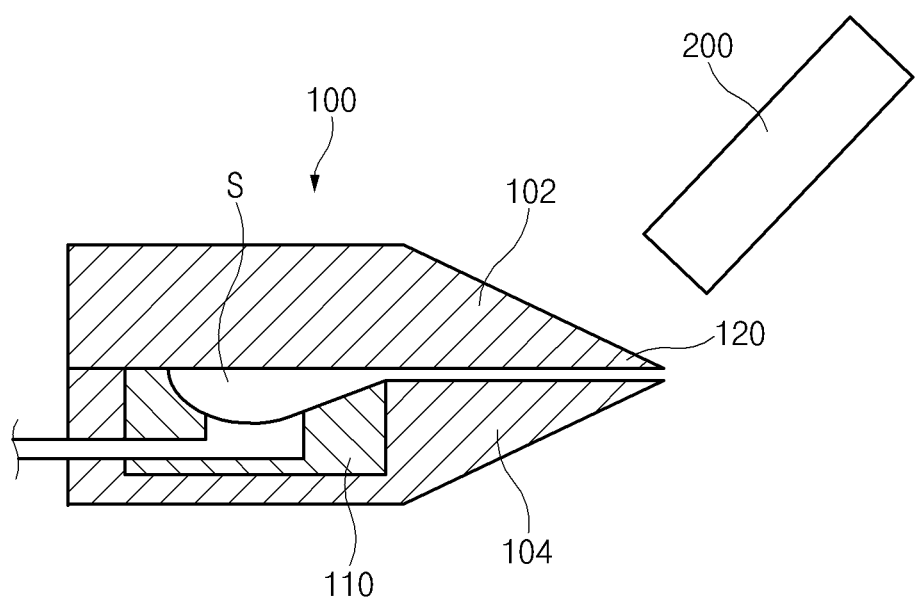
FIG. 2 is a schematic view of an electrode coating apparatus according to an embodiment of the present invention.
Figure 3:
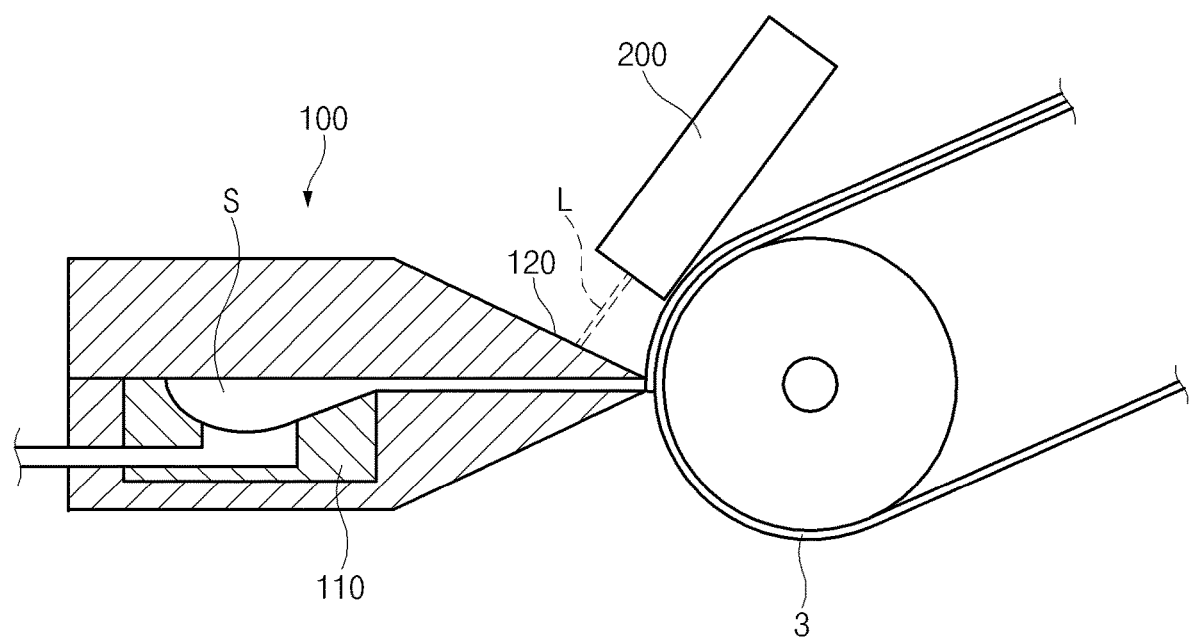
FIG. 3 is a use state view illustrating a process of applying electrode slurry to an electrode collector by using the electrode coating apparatus.

FIG. 2 is a schematic view of an electrode coating apparatus according to an embodiment of the present invention, and FIG. 3 is a use state view illustrating a process of applying electrode slurry to an electrode collector by using the electrode coating apparatus.

As illustrated in FIGS. 2 to 3, an electrode coating apparatus for applying electrode slurry S to an electrode collector 3 according to an embodiment of the present invention includes a storage part 110 in which the electrode slurry S is stored, a discharge part 120 discharging the electrode slurry S to the electrode collector 3, and a heating part 200 heating the discharge part 120.

The electrode slurry S may be a mixture of an active material, a conductive material, a binder, a solvent, and the like.

Also, the active material of the electrode slurry S may be a positive electrode active material or a negative electrode active material.

A chalcogenide compound is used as the positive electrode active material. For example, complex metal oxides such as $LiCoO_2$, $LiMn_2O_4$, $LiNiO_2$, $LiNi_{1-x}Co_xO_2(0<x<1)$, and $LiMnO_2$ are used as the chalcogenide compound.

Exemplary examples of the negative electrode active material include carbon (C)-based materials, silicon (Si), tin (Sn), tin oxides, composite tin alloys, transition metal oxides, lithium metal nitrides, or lithium metal oxides.

The electrode collector 3 may be a positive electrode or a negative electrode.

When the electrode collector 3 is the positive electrode, the electrode collector 3 is provided as a positive electrode foil made of an aluminum (Al) material and coated with the positive electrode active material discharged by the electrode coating apparatus.

When the electrode collector 3 is the negative electrode, the electrode collector 3 is provided as a negative electrode foil made of a copper (Cu) material and coated with the negative electrode active material discharged by the electrode coating apparatus.

The electrode coating apparatus according to an embodiment of the present invention includes a slot die 100 provided with an upper die 102 and a lower die 104, and the slot die 100 may include s storage part 110 and a discharge part 120.

The storage part 110 may be a place defined in the slot die 100 to store the electrode slurry S to be applied to the electrode collector 3.

The storage part 110 may be connected to the discharge part 120 to allow the electrode slurry S stored in the storage part 110 to be applied to the electrode collector 3 through the discharge part 120.

The discharge part 120 may be an outlet of the slot die 110 for discharging the electrode slurry S stored in the storage part 110 to the electrode collector 3.

The heating part 200 may heat the discharge part 120 of the slot die 100 to adjust an initial discharge temperature of the electrode slurry S discharged to the electrode collector 3 and thereby to maintain the electrode slurry S applied to the electrode collector 3 at a predetermined temperature.

The heating part 200 is configured to heat the discharge part 120. Although the heating part 200 is not limited to a heating method or device so long as the heating part 200 heats the discharge part 120 at a predetermined temperature, it is preferable that the heating part 200 adjusts a heating temperature of the discharge part 120.

In the electrode coating apparatus according to an embodiment of the present invention, the heating part 200 may be a laser heater provided at one side of the slot die 100.

The heating part 200 may irradiate a laser L to the discharge part 120 to heat the electrode slurry S passing through the discharge part 120.

Here, the heating part 200 may adjust an intensity of the laser L to adjust a temperature of the electrode slurry S passing through the discharge part 120. (See FIG. 3)

Figure 4:
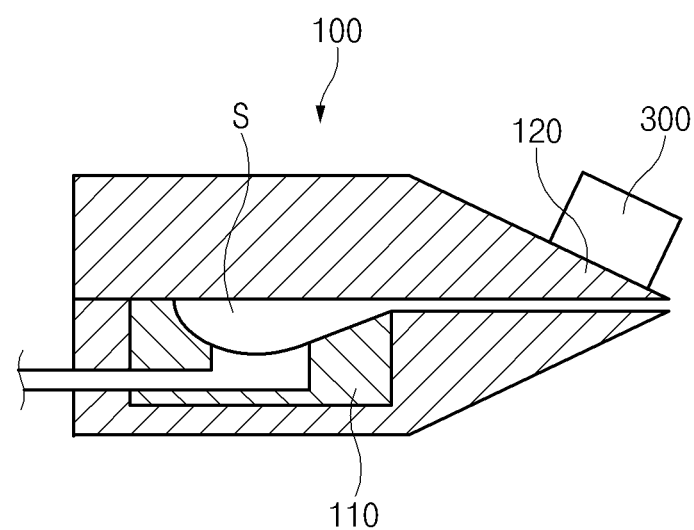
FIG. 4 is a schematic view of an electrode coating apparatus according to another embodiment of the present invention.

FIG. 4 is a schematic view of an electrode coating apparatus according to another embodiment of the present invention.

As illustrated in FIG. 4, in an electrode coating apparatus according to another embodiment of the present invention, a heating part 300 is provided as an electric heating heater and installed to come into contact with the outside of a discharge part 120 of a slot die 100 and thereby to heat the discharge part 120 through heat generation, thereby heating electrode slurry S passing through the discharge part 120.

Here, a heating temperature of the heating part 200 may be adjusted to adjust a temperature of the electrode slurry S.

Figure 5:
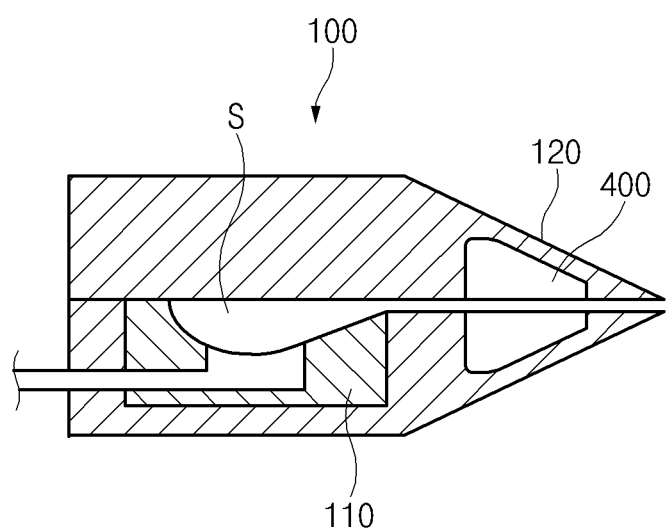
FIG. 5 is a schematic view of an electrode coating apparatus according to further another embodiment of the present invention.

FIG. 5 is a schematic view of an electrode coating apparatus according to further another embodiment of the present invention.

As illustrated in FIG. 5, in an electrode coating apparatus according to further another embodiment of the present invention, a heating part 400 is provided as an electric heating heater and installed inside a discharge part 120 of a discharge part 120 of a slot die 100 to heat the discharge part 120 through heat generation, thereby heating electrode slurry S passing through the discharge part 120.

Here, a heating temperature of the heating part 200 may be adjusted to adjust a temperature of the electrode slurry S.

As described above, the heating part 200 of the electrode coating apparatus according to the present invention may locally heat the discharge part 120.

In this case, the discharge part 120 heated by the heating part 200 may have a most preferable temperature of 100° C. to 130° C.

This is because when an active material of the electrode slurry S is a negative electrode active material, an evaporation temperature of water is ideally 100° C. because a solvent base is the water, and when the active material of the electrode slurry S is a positive electrode active material, an evaporation temperature of n-methylpyrrolidone (NMP) is ideally 130° C. because the solvent base is the n-methylpyrrolidone (NMP).

Thus, if the heating part 200 selectively heats the discharge part 120 according to kinds of active materials of the electrode slurry S so that the discharge part 120 is maintained at a temperature of 100° C. to 130° C., drying of the electrode slurry S passing through the discharge part 120 may start. Thus, the drying of the electrode slurry S may start while discharging the electrode slurry S.

When the temperature of the discharge part 120 is below 100° C., the drying of the electrode slurry S passing through the discharge part 120 may not start.

Also, if the temperature of the discharge part 120 exceeds 130° C., the application of the electrode slurry S to the electrode collector may not be normally performed because the viscosity of the electrode slurry S is lowered more than necessary due to the high temperature of the discharge part 120. On the other hand, when the electrode slurry S is dried too much, and thus, the viscosity of the electrode slurry S become high, the application of the electrode slurry S to the electrode collector may not be normally performed.

Also, when the heating part 200 heats the discharge part 120, the storage part 110 connected to the discharge part 120 is heated by heat conducted from the discharge part 120. Here, the storage part 110 may be heated at a temperature less than that of the discharge part 120.

That is, a temperature gradient of the slot die as a whole is generated by the heat conducted from the discharge part heated by the heating part 200, and when the storage part 110 is heated, the electrode slurry S stored in the storage part 110 may be reduced in viscosity to mix and store the electrode slurry S having a high solid content.

As described above, when the discharge part 120 is heated to maintain the electrode slurry S discharged from the discharge part 120 at a predetermined temperature at which the drying of the electrode slurry S starts, the overall drying time of the electrode slurry S may be reduced, and the drying zone in which the electrode slurry S applied to the electrode collector 3 is dried may be minimized in length.

Since the drying time of the electrode slurry S is reduced, a flow of the binder within the electrode slurry S applied to the electrode collector 3 may be minimized to improve adhesion between the electrode collector 3 and the electrode.

As described above, according to the present invention, the drying of the electrode slurry may start from the initial discharge of the electrode slurry to reduce the overall drying time of the electrode slurry applied to the electrode collector.

Also, according to the present invention, the drying zone in which the electrode slurry applied to the electrode collector is dried may be minimized in length.

Also, according to the present invention, the electrode slurry may decrease in viscosity due to the increase in temperature of the electrode slurry storage part and the discharge part and thus mixed to increase in solid content when the electrode slurry is manufactured.

Also, according to the present invention, the drying time of the electrode slurry applied to the electrode collector may be reduced to minimize the movement of the binder within the electrode slurry.

Also, according to the present invention, the flow of the binder within the electrode slurry may be minimized to improve the adhesion of the interface between the electrode and the collector.

Although the electrode coating apparatus according to the present invention has been described above with reference to the exemplary drawings, various changes and modifications may be made thereto by one skilled in the art without departing from the scope and spirit of the invention as set forth in the appended claims.

The invention claimed is:

1. An electrode coating apparatus for applying electrode slurry to an electrode collector, the electrode coating apparatus comprising:
   a slot die, the slot die comprising:
      a cavity storing the electrode slurry;
      an outlet discharging the electrode slurry stored in the cavity to the electrode collector, the outlet having a tapered exterior surface and located downstream from the cavity; and
   a heater spaced from the tapered exterior surface of the outlet of the slot die and directed at the outlet for heating the outlet,
   wherein the heater heats the tapered exterior surface of the outlet to to indirectly heat the electrode slurry passing through the outlet.

2. The electrode coating apparatus of claim 1, wherein the heater heats the outlet by using a laser.

3. The electrode coating apparatus of claim 1, wherein the heater heats the outlet at a temperature of 100° C. to 130° C.

4. The electrode coating apparatus of claim 1, wherein the heater locally heats the outlet.

5. The electrode coating apparatus of claim 1, wherein, when the heater heats the outlet, the cavity is heated at a temperature less than that of the outlet by heat conducted from the outlet.

6. The electrode coating apparatus of claim 5, wherein the heater starts the drying of the electrode slurry from the time when the electrode slurry passes through the outlet.

7. The electrode coating apparatus of claim 5, wherein the heater reduces a viscosity of the electrode slurry stored in the cavity.

8. The electrode coating apparatus of claim 5, wherein the heater adjusts a heating temperature of the outlet.

9. An electrode coating apparatus for applying electrode slurry to an electrode collector, the electrode coating apparatus comprising:
   a cavity storing the electrode slurry;
   an outlet discharging the electrode slurry stored in the cavity to the electrode collector, the outlet located downstream from the cavity and having an exterior surface with a decreasing cross section toward an end of the outlet; and
   a heater spaced from the outlet and directed at the outlet for heating the outlet,
   wherein the heater is a laser and a beam from the laser is directed at the exterior surface of the outlet, the exterior surface preventing the laser beam from contacting the electrode slurry within the outlet.

* * * * *